US012305564B2

United States Patent
Hayashi et al.

(10) Patent No.: US 12,305,564 B2
(45) Date of Patent: May 20, 2025

(54) ARRANGEMENT STRUCTURE OF COOLING SYSTEM IN CONSTRUCTION EQUIPMENT

(71) Applicant: Caterpillar SARL, Geneva (CH)

(72) Inventors: Yoshihiko Hayashi, Tokyo (JP); Keigo Hara, Tokyo (JP); Motoyuki Suzuki, Tokyo (JP)

(73) Assignee: Caterpillar SARL, Geneva (CH)

( * ) Notice: Subject to any disclaimer, the term of this patent is extended or adjusted under 35 U.S.C. 154(b) by 797 days.

(21) Appl. No.: 16/086,222

(22) PCT Filed: Apr. 3, 2017

(86) PCT No.: PCT/EP2017/057873
§ 371 (c)(1),
(2) Date: Sep. 18, 2018

(87) PCT Pub. No.: WO2017/174520
PCT Pub. Date: Oct. 12, 2017

(65) Prior Publication Data
US 2020/0291845 A1    Sep. 17, 2020

(30) Foreign Application Priority Data

Apr. 7, 2016 (JP) ................. 2016-076995

(51) Int. Cl.
*F01P 3/18* (2006.01)
*B60K 11/04* (2006.01)
(Continued)

(52) U.S. Cl.
CPC ................ *F01P 3/18* (2013.01); *B60K 11/04* (2013.01); *E02F 9/0866* (2013.01); *F01P 3/20* (2013.01);
(Continued)

(58) Field of Classification Search
CPC ........ F01P 3/18; F01P 3/20; F01P 5/06; F01P 11/029; F01P 2003/182; F01P 2060/02;
(Continued)

(56) References Cited

U.S. PATENT DOCUMENTS 2,283,698 A * 5/1942 Redman ................ D06M 17/06
442/381
4,556,171 A * 12/1985 Fukami .................... F01P 11/20
237/12.3 B
(Continued)

FOREIGN PATENT DOCUMENTS

CN           104879186 *  9/2015 ............. Y02T 10/12
DE          3922814 A *  4/1990 ............. B60K 11/04
(Continued)

OTHER PUBLICATIONS

International Search Report for related International Application No. PCT/EP2017/057873; report dated Jun. 8, 2017.

*Primary Examiner* — Jianying C Atkisson
*Assistant Examiner* — For K Ling (57) ABSTRACT

In the cooling system of construction equipment equipped with a plurality of heat exchangers including radiators, in providing a pressure-sealed reservoir tank connected in parallel with radiators in the cooling water circulation system between the radiators and engine, said reservoir tank is arranged so as not to protrude above the upper tier heat exchanger, the radiator and oil cooler are arranged lower than the upper tier heat exchanger in a lower tier heat exchangers, and the horizontal width of inter-cooler is made shorter than the horizontal width of radiator and oil cooler forming the tank space laterally to the inter-cooler where the pressure-sealed reservoir tank is arranged on said tank space.

9 Claims, 5 Drawing Sheets

(51) Int. Cl.
*E02F 9/08* (2006.01)
*F01P 3/20* (2006.01)
*F01P 5/06* (2006.01)
*F01P 11/02* (2006.01)
*F28D 1/04* (2006.01)

(52) U.S. Cl.
CPC ............... *F01P 5/06* (2013.01); *F01P 11/029* (2013.01); *F28D 1/0443* (2013.01); *F01P 2003/182* (2013.01); *F01P 2060/02* (2013.01); *F01P 2060/04* (2013.01)

(58) Field of Classification Search
CPC ... F01P 2060/01; F01P 2060/04; B60K 11/04; E02F 9/0866; F28D 1/0443; F28D 1/0452; F28D 1/0408
See application file for complete search history.

(56) References Cited

U.S. PATENT DOCUMENTS

| | | | | |
|---|---|---|---|---|
| 5,197,538 | A * | 3/1993 | Nagasaka | F28F 9/0224 165/149 |
| 5,680,833 | A * | 10/1997 | Smith | F01P 11/029 165/104.32 |
| 6,129,056 | A * | 10/2000 | Skeel | F28D 1/0426 123/41.49 |
| 6,817,404 | B2 * | 11/2004 | Frana-Guthrie | B60H 1/00535 180/68.1 |
| 2003/0034153 | A1 * | 2/2003 | Hitt | F04D 29/582 165/125 |
| 2004/0025813 | A1 * | 2/2004 | Sasano | F01P 11/18 123/41.27 |
| 2004/0250988 | A1 * | 12/2004 | Machanek | F28F 9/002 165/76 |
| 2006/0048924 | A1 * | 3/2006 | Desai | F01P 11/029 165/148 |
| 2012/0227943 | A1 * | 9/2012 | Nakashima | F28D 1/0417 165/121 |
| 2016/0109191 | A1 * | 4/2016 | Skrzyniarz | F28D 1/0443 165/47 |

FOREIGN PATENT DOCUMENTS

| | | | | |
|---|---|---|---|---|
| DE | 4244039 | A1 * | 7/1994 | ............... F01P 3/18 |
| DE | 19514016 | C1 * | 8/1996 | ............... B60K 11/04 |
| JP | H7-27371 | A | 6/1995 | |
| JP | H11 190046 | A | 7/1999 | |
| JP | 2001341533 | A | 12/2001 | |
| JP | 2003049649 | A | 12/2003 | |
| JP | 2006017050 | A | 1/2006 | |
| JP | 2013024200 | A | 2/2013 | |
| JP | 2014114763 | | * | 6/2014 | |
| JP | 2014114763 | A | * | 6/2014 | ............... F01P 11/00 |

* cited by examiner

ARRANGEMENT STRUCTURE OF COOLING SYSTEM IN CONSTRUCTION EQUIPMENT

CROSS-REFERENCE TO RELATED APPLICATION

This Application is a 35 USC § 371 US National Stage filing of International Application No. PCT/EP2017/057873 filed on Apr. 3, 2017 which claims priority under the Paris Convention to Japanese Serial No. 2016-076995 filed on Apr. 7, 2016.

TECHNICAL FIELD

This invention relates to the technical field of arrangement structures of a cooling system equipped with a plurality of heat exchangers such as radiators, cooling fans, reservoir tanks, etc., in construction equipment such as hydraulic shovels, etc.

BACKGROUND TECHNOLOGY

In general, in the construction equipment such as hydraulic shovels, etc., various heat exchangers such as a radiator to cool engine cooling water, an oil cooler to cool hydraulic oil, and an inter-cooler, etc., to cool compressed air generated by a turbocharger are mounted Also a cooling system equipped with a cooling fan that supplies cooling wind to these heat exchangers, and a reservoir tank, etc., that store engine cooling water to handle volume change by heat expansion of engine cooling water are provided.

As the aforementioned reserve tank, traditionally an atmosphere-open type reserve tank connected to the radiator via radiator cap with a pressure adjustment function has been generally used. On the contrary, a pressure-sealed reservoir tank that is generally known is connected in parallel with the radiator in the cooling water circulation system between the radiator and an engine (for instance, refer to the Patent Literature 1). In case that such a pressure-sealed reservoir tank is used, part of engine cooling water is circulated via the pressure-sealed reservoir tank. Also, the volume change by heat expansion of cooling water is absorbed by the phase part within the pressure-sealed reservoir tank, hence air removal is performed within the cooling water circulation system, so compared with the atmosphere-open type reservoir tank, there is an advantage in that it is superior in air bubble separation performance On the other hand, for the construction equipment such as a hydraulic shovel, etc., as described before, a plurality of heat exchangers such as a radiator, an oil cooler, and an inter-cooler, etc., are provided, but in this case, those are well known in which a plurality of heat exchangers that comprise these radiators are arranged side-by-side in parallel with the cooling air flow of a cooling fan to be unified to form an approximately square shaped cooling device, and said unified cooling device is stored in the cooling device storage part in the rear of an operation room (For instance, refer to the Patent Literature 2). By arranging such a plurality of heat exchangers in parallel on side-by-side, any heat exchanger can secure a good cooling efficiency and also maintenance such as cleaning, etc., of each heat exchanger can be easily performed.

PRIOR ART LITERATURE

Patent Literature

Patent Literature 1: Utility Patent H7-27317 Gazette
Patent Literature 2: Japanese Unexamined Patent Application Publication No 2003-49649 Gazette

SUMMARY OF INVENTION

Challenge the Invention Attempts to Solve

By the way, for the aforementioned pressure-sealed reservoir tank, to remove air in the cooling water within the circulation system of the engine cooling water, it is necessary to be positioned higher than the top part of the cooling water circulation path that comprises an engine and radiator. Because of this, as in the aforementioned patent literature 2, regarding those equipped with a cooling device unified by arranging a plurality of heat exchangers in parallel side-by-side that comprises radiators, in case that the pressurized sealed type reservoir tank is attempted to be adopted. The reservoir tank must be arranged higher than the top edge position of the radiator, and in order to make it higher than the top edge position of a radiator, the reservoir tank must be arranged so as to protrude upward from the cooling device. The needs are generated to make the ceiling height of the cooling device housing part higher for that portion, thus an issue exists that prevents the rearward field of vision from the operation room, and herein lies the issue to be solved by this invention.

Means To Solve Challenge

The present invention was created in order to solve these challenges in view of such situations as described above, and according to the invention in claim 1, the arrangement structure of the cooling system in the construction equipment is characterized such that in the cooling system of the construction equipment equipped with a plurality of heat exchangers that includes a radiator, a cooling fan that supplies cooling air flow to these heat exchangers, and a pressure-sealed reservoir tank connected to an engine in parallel with the radiator in a cooling water circulation system between the aforementioned radiator and the engine. For the aforementioned plurality of heat exchangers, the at least one heat exchanger other than the radiator is an upper tier heat exchanger, and lower tier heat exchangers comprise at least the radiator and are arranged lower than the upper tier heat exchanger. The horizontal width of the entire upper tier heat exchanger arranged is made to be shorter than the horizontal width of the entire lower tier heat exchanger forming the tank space laterally to the upper tier heat exchanger such that the reservoir tank is arranged in the tank space.

According to the invention in claim 2, the arrangement structure of the cooling system in the construction equipment is characterized such that in claim 1, the upper tier heat exchanger and the one or more lower tier heat exchangers are arranged so as to be side-by-side.

According to the invention in claim 3, the arrangement structure of the cooling system in the construction equipment is characterized such that in claim 1 or claim 2, the one or more lower tier heat exchangers is a radiator and an oil cooler and the upper tier heat exchanger is an inter-cooler.

According to the invention in claim 4, the arrangement structure of the cooling system in the construction equipment is characterized such that in any of the claims from claim 1 through claim 3, the upper tier heat exchanger and the one or more lower tier heat exchangers are built into a square frame-shaped frame member, and a fan shroud that surrounds a cooling fan is connected to the same frame member. Also, on the upper side corner of the frame member and fan shroud a stepped concave part that partitions the tank space is formed.

Effect of Invention

According to claim 1 of the invention, the pressure-sealed reservoir tank can be higher than the upper end position of the radiator and be arranged not to protrude upward from the entire heat exchanger. This can control the ceiling height of the storage room where the heat exchanger.

According to claim 2, a plurality of heat exchangers that includes a radiator can be arranged such that they don't mutually overlap with respect to the cooling air flow and secure improved cooling efficiency over the prior art, and superior maintenance characteristics such as cleaning, etc.

According to claim 3, the present invention can be applied for the construction equipment provided with a radiator, an oil cooler, and an inter-cooler, wherein the inter-cooler is an upper tier heat exchanger allowing the piping that connects the inter-cooler and engine intake air side to be shortened.

According to claim 4, by the stepped concave part formed in the frame member and fan shroud, the reservoir tank can be shielded from a cooling wind and also, the upper side corner part of the frame member and fan shroud where the stepped concave part is formed_are far away from the fan rotation trajectory of the cooling fan, the impact on cooling efficiency can be made as small as possible.

FORM TO EMBODY THE INVENTION

The following explains the embodiments of the present invention based on drawings. In the figure, 1 is a hydraulic shovel which is an example of the construction equipment of the present invention. Said hydraulic shovel 1 is configured from each part of a lower part carrier 2, the upper turning body 3 which is rotatably supported on said lower part carrier 2, and work device 4 mounted on said upper part turning body 3, etc. An operating room 5 is provided in the front part of the upper part turning body 3 and in the back part of said operating room 5 is provided a machine room 7 where an engine (not shown in figure) and the cooling system 6 later described etc. are stored, and furthermore, a counter weight 8 is installed in the back side of said machine room 7.

Figure 1:
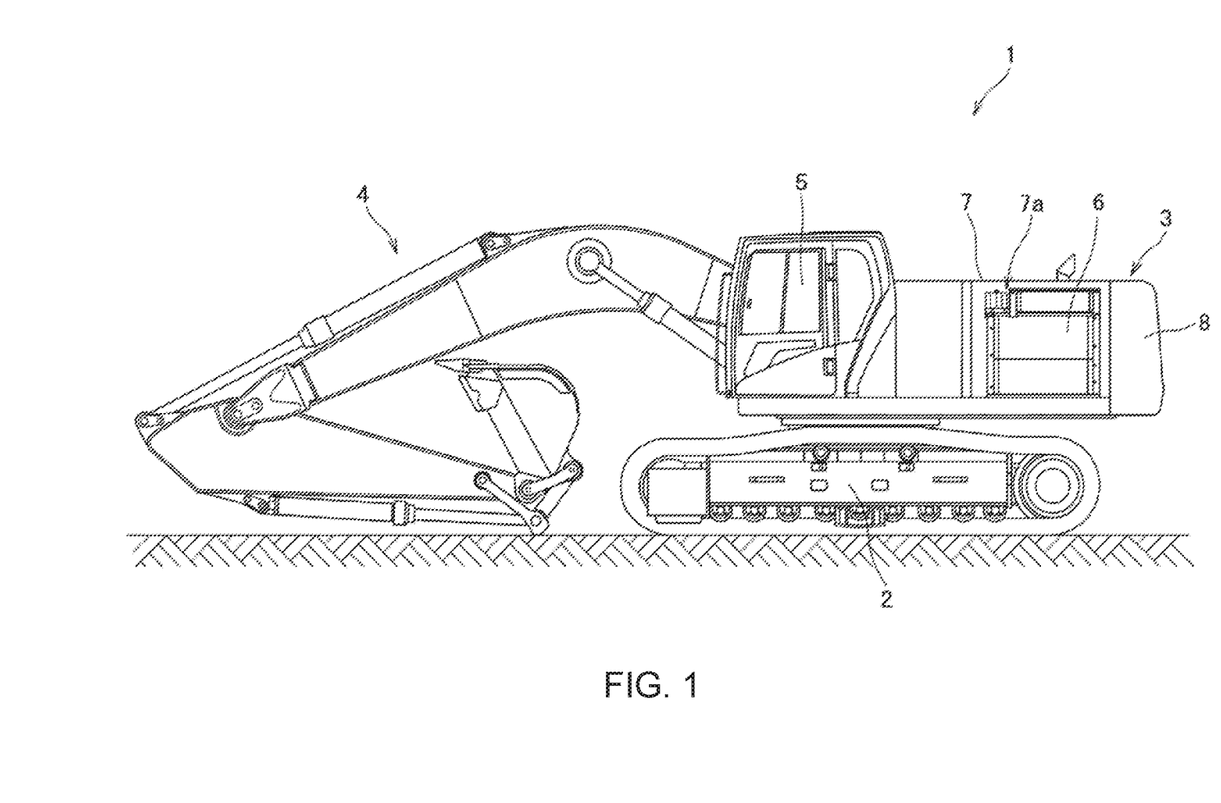
FIG. 1 is a side view drawing of a hydraulic shovel with the side cover removed.
Figure 2:
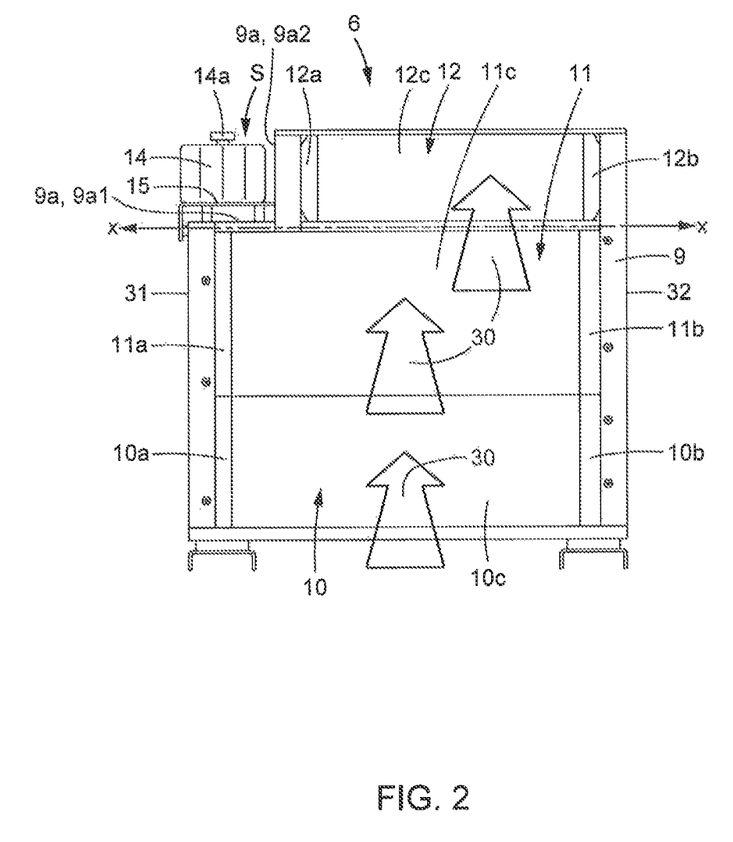
FIG. 2 is a main section front view drawing of a cooling system.
Figure 5:
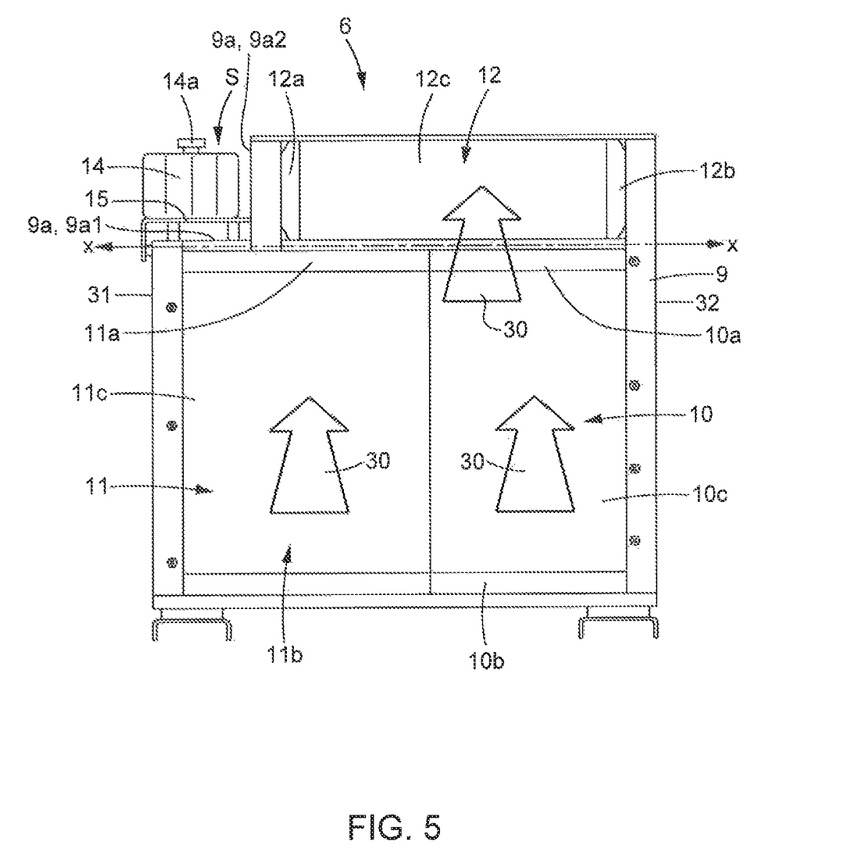
FIG. 5 is a main section front view drawing of a cooling system in the second embodiment.

The aforementioned cooling system 6 is unified by building a plurality of heat exchangers into a square framed frame member 9. As used herein, the term "lower tier heat exchanger" means a heat exchanger disposed in the frame member 9 below plane X (described later herein as defined by the bottom section 9a1 of the frame stepped concave part 9a). As used herein, the term "upper tier heat exchanger" means a heat exchanger disposed above plane X. According to a form of this embodiment, the heat exchangers that are provided and correspond to the one or more lower tier heat exchangers on a lower tier of the cooling system 6 of the present invention include a radiator 10 to cool the engine cooling water and an oil cooler 11 to cool hydraulic oil. The heat exchanger that is provided and corresponds to the upper tier heat exchanger on an upper tier of the cooling system 6 of the present invention is an inter-cooler 12 to cool air that is compressed by engine supercharger. Then, the cooling system 6 in which the radiator 10, oil cooler 11 and inter-cooler 12 are assembled, is housed in the cooling device storage part 7a provided in a machine room 7. Also, the cooling system 6 is configured to be cooled by the cooling air that flows in by the rotation of a cooling fan 13 positioned in the rear side of a cooling system 6, as shown in FIGS. 2 and 5. Moreover, it is configured such that the upper and front side of the cooling device storage part 7a is covered by a side cover free to open and close (not shown in figure), and outer air is introduced from the ventilation hole formed on said side cover. Also, by opening the side cover, maintenance of the cooling system 6 can be performed. Moreover, in explaining the embodiment, with respect to the cooling air flow, the upper flow side is the front of the cooling system 6 and the lower flow side is the back side.

Here, the aforementioned radiator 10, oil cooler 11, and inter-cooler 12 are provided between the inflow side tanks 10a, 11a, 12a into which cooled fluid (in radiator 10, engine cooling water; in oil cooler 11, hydraulic oil; in inter-cooler 12 compressed air) flows in, and the outflow side tanks 10b, 11b, 12b from which cooled fluid flow out, and these inflow side tanks 10a, 11a, 12a and outflow side tanks 10b, 11b, 12b, and configured for general purposes to be equipped with cores 10c, 11c, 12c having a plurality of tubes and cooling fins through which cooled fluid passes. In the embodiment, regarding these radiators 10, oil cooler 11 and inter-cooler 12, the inflow side tanks 10a, 11a, 12a and outflow side tanks 10b, 11b, 12b are provided on right and left side of cores 10c, 11c 12c, and a side flow type in which cooled fluid flows in the right and left direction is used. Then, in this exemplary embodiment, the radiator 10 and oil cooler 11 are lower tier heat exchangers with the radiator 10 positioned on a lower side of the lower tier heat exchangers, and the oil cooler 11 is positioned on an upper side of the lower tier heat exchangers, whereby the oil cooler 11 and radiator 10 are positioned above and below, respectively to each other, and each is oriented in parallel horizontally to plane X and against the cooling air flow 30. Furthermore, above the lower tier heat exchangers (in the embodiment, among the lower tier heat exchangers, with the oil cooler 11 positioned on the upper side of the lower tier heat exchangers), the inter-cooler 12, which is an upper tier heat exchanger, is positioned horizontally in parallel with respect to plane X and to the lower tier heat exchangers against the cooling air flow 30 in the upper tier heat exchanger. In this case, the horizontal width of the radiator 10 and oil cooler 11, which are lower tier heat exchangers and positioned horizontally parallel to each other and to plane X (as a top and bottom heat exchanger as the lower tier heat exchangers), are provided with at approximately the same size. Also, the horizontal width of the inter-cooler 12, which is the upper tier heat exchanger, is provided shorter than the horizontal width of the radiator 10 and oil cooler 11 as the lower tier heat exchangers, thereby forming on a lateral side of inter-cooler 12 a tank space for a reservoir tank 14 later described. Then, in the upper side corner of the frame member 9, where the radiator 10, the oil cooler 11, and the inter-cooler 12 are built, a frame member stepped concave part 9a that partitions the aforementioned tank space S is formed. As can be seen in FIGS. 2 and 5, the frame member stepped concave part 9a that partitions the aforementioned tank space S includes a bottom section 9a1 and a side section 9a2 that intersects with the bottom section 9a1. Bottom section 9a1 defines a horizontal plane X. Plane X is oriented to extend from a first side 31 of the frame member 9 to a second side 32 of the frame member 9. The first side 31 of the frame member is disposed below a pressure-sealed reservoir tank 14. The second side 32 of the frame member 9 is disposed opposite to the first side 31.

Here, the aforementioned radiator 10, oil cooler 11, and inter-cooler 12 are provided between the inflow side tanks 10a, 11a, 12a into which cooled fluid (in radiator 10, engine cooling water; in oil cooler 11, hydraulic oil; in inter-cooler 12 compressed air) flows in, and the outflow side tanks 10b, 11b, 12b from which cooled fluid flow out, and these inflow side tanks 10a, 11a, 12a and outflow side tanks 10b, 11b, 12b, and configured for general purposes to be equipped with cores 10c, 11c, 12c having a plurality of tubes and cooling fins through which cooled fluid passes. In the embodiment, regarding these radiators 10, oil cooler 11 and inter-cooler 12, the inflow side tanks 10a, 11a, 12a and outflow side tanks 10b, 11b, 12b are provided on right and left side of cores 10c, 11c 12c, and a side flow type in which cooled fluid flows in the right and left direction is used. Then, in this exemplary embodiment, the radiator 10 and oil cooler 11 are lower tier heat exchangers with the radiator 10 positioned on a lower side of the lower tier heat exchangers, and the oil cooler 11 is positioned on an upper side of the lower tier heat exchangers, whereby the oil cooler 11 and radiator 10 are positioned above and below, respectively to each other, and in parallel horizontally against the cooling air flow. Furthermore, above the lower tier heat exchangers (in the embodiment, among the lower tier heat exchangers, with the oil cooler 11 positioned on the upper side of the lower tier heat exchangers), the inter-cooler 12, which is an upper tier heat exchanger, is positioned horizontally in parallel with respect to the lower tier heat exchangers against the cooling air flow in the upper tier heat exchanger. In this case, the horizontal width of the radiator 10 and oil cooler 11, which are lower tier heat exchangers and positioned horizontally parallel as a top and bottom heat exchanger as the lower tier heat exchangers, are provided with at approximately the same size. Also, the horizontal width of the inter-cooler 12, which is the upper tier heat exchanger, is provided shorter than the horizontal width of the radiator 10 and oil cooler 11 as the lower tier heat exchangers, thereby forming on a lateral side of inter-cooler 12 a tank space for a reservoir tank 14 later described. Then, in the upper side corner of the frame member 9, where the radiator 10, the oil cooler 11, and the inter-cooler 12 are built n, a frame member stepped concave part 9a that partitions the aforementioned tank space S is formed.

Here, as the aforementioned upper tier heat exchanger, any heat exchanger other than radiator 10 can be selected, but in this embodiment, regarding construction equipment such as hydraulic shovel 1, etc., heat radiating area is small compared with the radiator 10 and oil cooler 11. Also, the inter-cooler 12 connected to engine air intake side parts (turbocharger, air intake manifold) provided on the upper side of the engine is set to be the upper tier heat exchanger. Then, as described before, tank space S ends up being formed laterally to the inter-cooler 12 which is said upper tier heat exchanger. While said tank space S is included, the vertical and horizontal sizes of each heat exchanger (radiator 10, oil cooler 11, inter-cooler 12) is set up so that the unified cooling system 6 becomes approximately square shaped.

Figure 3:
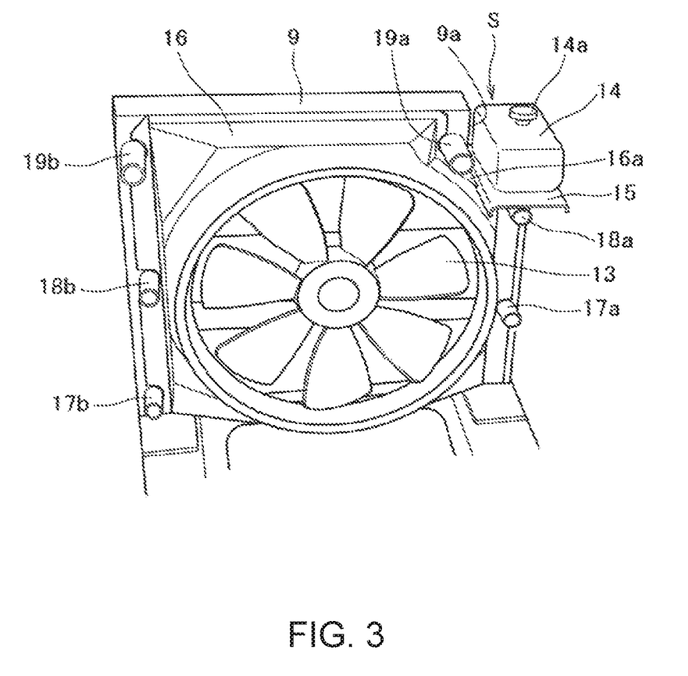
FIG. 3 is a main section back view drawing of a cooling system.

On the other hand, a fan shroud 16, that surrounds the outer periphery of the aforementioned cooling fan 13, is connected to the back side of the square frame shaped frame member 9 where the aforementioned radiator 10, oil cooler 11 and inter-cooler 12 are assembled. The fan shroud 16 is designed to improve the cooling efficiency by arranging the trajectory of the cooling air flow. The upper corner of said fan shroud 16, while connected with the aforementioned frame member stepped concave unit 9a, is a stepped concave unit 16a (shroud stepped concave unit 16a) formed to the partition tank space S. Then, it is configured to arrange a reservoir tank 14 via bracket 15 in the tank space S partitioned by the frame member stepped concave unit 9a and shroud stepped concave unit 16a. In this case, the part where the stepped concave units 9a, 16a are formed in the frame member 9 and fan shroud 16, as shown in FIG. 3, is positioned far away from the fan rotation trajectory of the cooling fan 13, with minimal impact on cooling efficiency. In addition, the reservoir tank 14 is configured to be able to be shielded from the cooling air by the stepped concave units 9a, 16a of the frame member 9 and fan shroud 16, respectively. Moreover, 17a is a radiator inflow side piping to be connected to the inflow side tank 10a of the radiator 10; 17b is a radiator outflow side piping to be connected to the outflow side tank 10b of the radiator 10; 18a is an oil cooler inflow side piping to be connected to the inflow side tank 11a of oil cooler 11; 18b is an oil cooler outflow side piping to be connected to the outflow side tank 11b of oil cooler 11; 19a is an inter-cooler inflow side piping to be connected to the inflow side tank 12a of inter-cooler 12; 19b is an inter-cooler outflow side piping to be connected to the inflow side tank 12a of inter-cooler 12.

Figure 4:
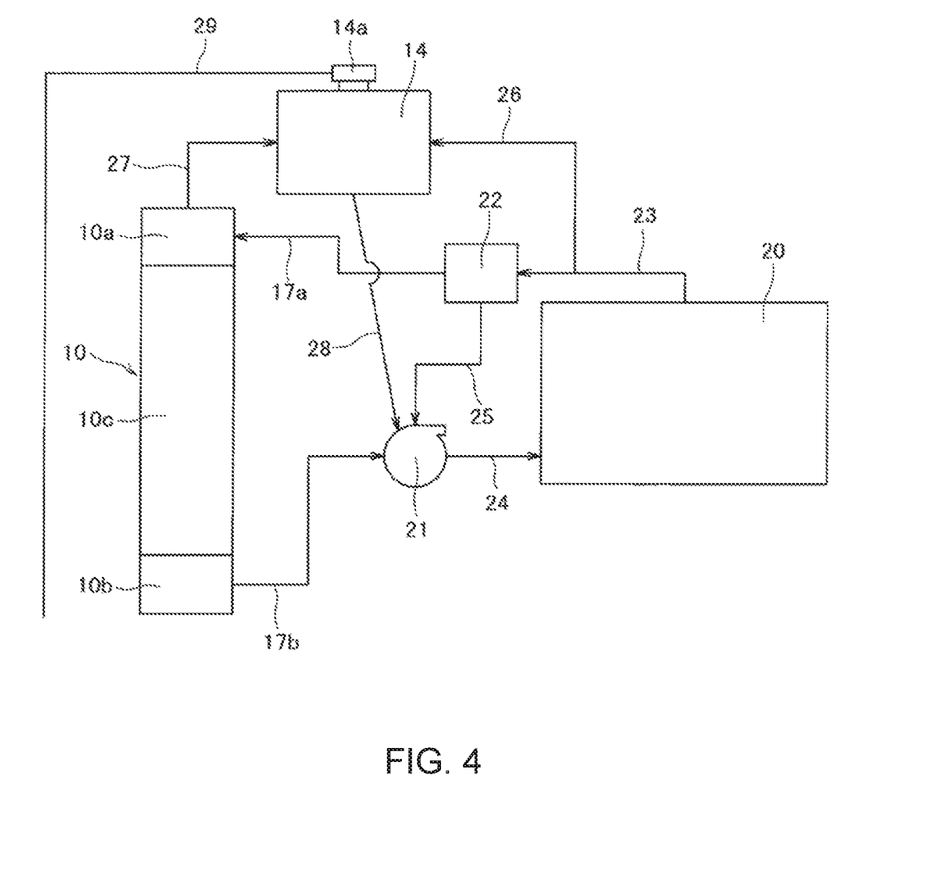
FIG. 4 is a block drawing showing an engine cooling water circulation system.

Next, the engine cooling water circulation system in the embodiment is explained based on FIG. 4. In FIG. 4, 10 is the aforementioned radiator, and 10a, 10b, 10c are an inflow side tank, an outflow side tank and a core of the radiator 10; 14 is the aforementioned reserve tank; 20 is an engine (water jacket provided in an engine); 21 is a water pump and 22 is a thermostat.

Then, engine cooling water circulates while the sealed and pressurized conditions prevail between the aforementioned engine 20 and radiator 10. That is, the engine cooling water that flows out from engine 20 flows into the radiator 10 via engine exit side path 23, thermostat 22 and radiator inflow side piping 17a, and after cooled by said radiator 10, arrives at the water pump 21 via radiator outflow side piping 17b, and is supplied to an engine 20 via engine entrance side path 24 from said water pump 21. Moreover, a bypath path 25 is provided between the aforementioned thermostat 22 and water pump 21, and when engine cooling water temperature is low, the engine cooling water that flowed out from engine 20 arrives at water pump 21 via bypath 25 from thermostat 22 without going via radiator 10, and is supplied to the engine 20.

Furthermore, the reservoir tank 14 is connected in parallel with radiator 10 in the cooling water circulation system between the aforementioned radiator 10 and engine. That is, the reservoir tank 14 has a liquid phase part that stores part of engine cooling water and a gas phase above said liquid phase part internally. The reservoir tank 14 is a pressure-sealed tank that changes the storage volume of engine cooling water, depending on the volume change accompanied by temperature change of engine cooling water and is connected respectively to the engine exit side path 23, the inflow side tank of radiator 10a via engine side vent path 26, the radiator side vent path 27, and the water pump 21 via branched path 28. Then, part of the engine cooling water circulates via this reservoir tank 14, and the reservoir tank 14 removes air in the engine cooling water from inside the reserve tank 14. Moreover, 14a is a tank cap to block a water pouring mouth of the aforementioned reservoir tank 14, and said tank cap 14a has a pressure adjustment function in case the pressure inside reservoir tank 14 exceeds a pre-set upper limit pressure, said pressure is released outside of the cooling water circulation system via drain path 29.

Then, it is necessary that the aforementioned reservoir tank 14 is positioned at the top location within the cooling water circulation system to remove air within the cooling water circulation system. Because of this, it is necessary that the reservoir tank 14 be placed higher than the top edge position of the radiator 10, with the reservoir tank 14 positioned in the tank space S laterally to the inter-cooler 12, which is an upper 10 tier heat exchanger, and is configured to be positioned to be higher than the radiator 10, which is a lower tier heat exchanger.

In the embodiment configured as described, the cooling system 6 in hydraulic shovel 1 is provided with a radiator 10, an oil cooler 11 and an inter-cooler 12. The cooling system 6 is configured to be equipped with a pressure-sealed reservoir tank 14 connected in parallel with the radiator 10 in the cooling water circulation system between the cooling fan 13 that supplies cooling air flow to these plurality of heat exchangers (radiator 1, oil cooler 11 and inter-cooler 12), the radiator 10 and an engine. But in this cooling system 6, regarding the aforementioned plurality of heat exchangers, the inter-cooler 12, which is a heat exchanger other than radiator 10, is used as the upper tier heat exchanger, and the radiator 10 and oil cooler 11 is used as lower tier heat exchangers and are arranged below the upper tier heat exchanger. Additionally, the horizontal width of the entire upper tier heat exchanger in said arrangement is set up shorter than the horizontal width of the entire lower tier heat exchangers. Thus, the tank space S is formed laterally to the upper tier heat exchanger. Then, the aforementioned reservoir tank 14 is arranged in said tank space S.

In the embodiment with the present invention thus executed, by arranging the reservoir tank 14 in the tank space S formed laterally to the upper tier heat exchanger positioned above the one or more lower tier heat exchangers where radiator 10 is a lower tier heat exchanger, said reservoir tank 14 is enabled to be arranged to be higher than the top end position of radiator 10 and also not to protrude upward from the entire heat exchanger. As a result, even regarding the pressure-sealed reservoir tank 14 connected in parallel with radiator 10 in the cooling water circulation system between the radiator 10 and engine, said reservoir tank 14 can be positioned without protruding upward from the entire heat exchanger The arrangement of the reservoir tank 14 in the tank space S allows the ceiling height of the cooling device storage part 7a where the heat exchanger is stored to be controlled and avoid increases in the ceiling height of cooling device storage part 7a that can cause a deterioration of the rear-view field of vision from operating room 5.

Also, the radiator 10 and oil cooler 11, which are lower tier heat exchangers, are positioned horizontally in parallel to plane X, as illustrated in FIG. 2 being situated in the lower tier as top and bottom heat exchanges, with respect to the cooling air flow that is supplied by cooling fan 13. The inter-cooler 12, which is the upper tier heat exchanger, is positioned horizontally in parallel to plane X and parallel with respect to the radiator 10 and oil cooler 11. Also, a plurality of heat exchangers that include radiators 10 result in being positioned such that they don't mutually overlap with respect to cooling air flow. Thus, improved cooling efficiency is secured.

Moreover, in the embodiment, as a plurality of heat exchangers, the radiator 10 and oil cooler 11 and inter-cooler 12 are provided that are heat exchangers generally provided for construction equipment such as hydraulic shovel 1, etc., but the inter-cooler 12, which is the upper tier heat exchanger, uses those that have a smaller radiation area compared with the radiator 10 and oil cooler 11 that are generally the lower tier heat exchangers. Though the horizontal width is shortened, the impact on cooling efficiency is minimal. Furthermore, the inflow side 19a and outflow side piping 19b of inter-cooler 12 are connected to the engine air intake member (turbocharger, air intake manifold) provided above the engine, providing an advantage in that by using the inter-cooler 12 as the upper tier heat exchanger, the inflow side 19a and outflow side piping 19b of inter-cooler 12 connected to the engine air intake side member can be shortened.

Furthermore, the upper tier heat exchanger (inter-cooler 12) and the lower tier heat exchangers (radiator 10 and oil cooler 11) are unified as the cooling system 6 and built into the square framed frame member 9. Said frame member 9 is connected to the fan shroud 16 that surrounds the cooling fan 13. On the upper side corner of the frame member 9 and fan shroud 16, a stepped concave units 9a, 16a is formed and partitions the tank space S where the reservoir tank 14 is provided. Hence, the reservoir tank 14 can be shielded from a cooling air flow by said stepped concave unit 9a, 16a. The upper corner of the frame member 9 and fan shroud 16 where the stepped concave unit 9a and 16a are formed is far away from the fan rotation trajectory of cooling fan 13. Thus, the impact on cooling efficiency can be reduced as much as possible.

Moreover, the present invention cannot be limited to the aforementioned embodiment (first embodiment), and as in the second embodiment shown in FIG. 5, the radiator 10 and oil cooler 11 that are the lower tier heat exchangers can be positioned vertically with respect to plane X and in parallel to each other, as illustrated in FIG. 5 being situated in the lower tier as right and left heat exchanges, with respect to cooling air flow 30 supplied by cooling fan 13. In the illustrated embodiment, even if lower tier heat exchangers themselves are positioned vertically with respect to plane X and in parallel to each other, situated in the lower tier as right and left heat exchanges, the reservoir tank 14 positioned in tank space S laterally to the inter-cooler 12 that is the upper tier heat exchanger is positioned higher than the upper end part of the radiator 10 that is one of the lower tier heat exchangers, and plays the similar operation effect to the aforementioned first embodiment. Furthermore, in FIG. 5, as the radiator 10 and oil cooler 11 that are the lower tier heat exchangers, a down flow type radiator 10 is illustrated in which the inflow side tanks 10a, 11a and the outflow side tanks 10b, 11b are provided above and below with respect to the cores 10c, 11c, but even in the second embodiment, as in the first embodiment, they can be made to be a side flow type radiator and oil cooler 11 shown in FIG. 2. By using a pressure-sealed reservoir tank 14, the upper tier heat exchanger can be arranged on the upper side since the water injection mouth is provided in the reservoir tank 14 but not in radiator 10, even if a down flow type radiator 10 is used.

Furthermore, in the aforementioned first and second embodiments, the upper tier heat exchanger was set to be an intercooler, but the upper tier heat exchanger is not limited to an intercooler, as long as it is a heat exchanger other than a radiator. For instance, an air conditioner condenser can be made to be the upper tier heat exchanger. Moreover, the upper tier heat exchanger and lower tier heat exchangers can be singular or plural. Furthermore, in addition to the upper tier heat exchanger and lower tier heat exchangers, even in the event these upper tier heat exchangers, lower tier heat exchangers, and other heat exchanger overlap with respect to cooling air flow, the present invention may still be implemented.

Moreover, the present invention is not limited to hydraulic shovels, but of course, can be implemented for various construction equipment.

USABILITY IN INDUSTRY

The present invention can be utilized for the cooling system of construction equipment equipped with a plurality of heat exchangers including radiators, cooling fans, etc.

The invention claimed is:

1. A cooling system for construction equipment having an operating room positioned in front of a machine room with the cooling system being provided in the machine room, the cooling system comprising:
   a plurality of heat exchangers disposed in a frame member, the frame member including a first side, a second side, a top side and a bottom side, the heat exchangers comprising:
      a plurality of lower tier heat exchangers, each of the lower tier heat exchangers disposed below a tank space and under a reservoir tank capable of pressure adjustment, wherein the plurality of lower tier heat exchangers are disposed inside the frame member and include a first lower tier heat exchanger and a second lower tier heat exchanger, wherein the first lower tier heat exchanger is a radiator, wherein the radiator is disposed between the bottom side and the second lower tier heat exchanger; and
      an upper tier heat exchanger disposed above the lower tier heat exchangers and disposed laterally adjacent to the reservoir tank;
   a cooling fan that supplies cooling air flow to the lower tier heat exchangers and the upper tier heat exchanger, wherein an upper tier horizontal width of the upper tier heat exchanger is shorter than a lower tier horizontal width of the lower tier heat exchangers forming the tank space above the lower tier heat exchangers, the tank space oriented laterally to the upper tier heat exchanger and disposed radially outward of the cooling fan, the tank space partially defined by first and second outer surfaces of a stepped concave part of the frame member, the stepped concave part including a bottom section and a side section that intersects the bottom section, wherein the bottom section includes the first outer surface, and the side section includes the second outer surface, the second outer surface oriented perpendicular to the first outer surface and parallel to the first side and the second side of the frame member, the first outer surface oriented to extend horizontally in a plane X, the plane X oriented to extend in a horizontal direction from the first side of the frame member to the second side of the frame member and in a horizontal direction from a front of the frame member to a back of the frame member, the first side of the frame member disposed below the reservoir tank, the second side of the frame member disposed opposite to the first side, the reservoir tank disposed above the bottom section, the bottom section disposed between the upper tier heat exchanger and the radiator; and
   the reservoir tank connected in parallel with the radiator in a cooling water circulation system between an engine and a water pump of the construction equipment, wherein the reservoir tank is disposed in the tank space above the radiator and does not extend above the upper tier heat exchanger, wherein the reservoir tank is configured to store a liquid phase and a gas phase, and is further configured to adjust a storage volume of the liquid phase based on a volume change and a temperature change of the liquid phase,
   wherein the lower tier heat exchangers are disposed entirely below the plane X, and the upper tier heat exchanger is disposed entirely above the plane X, and a height of the cooling system does not deteriorate a rear-view field of vision from the operating room.

2. The cooling system for the construction equipment of claim 1, wherein the lower tier heat exchangers are arranged side-by-side.

3. The cooling system for the construction equipment of claim 1, in which the first lower tier heat exchanger is an oil cooler, wherein the upper tier heat exchanger is an intercooler.

4. The cooling system for the construction equipment of claim 1, comprising:
   a fan shroud mounted on the frame member and surrounding the cooling fan, wherein the tank space is further defined at an upper side corner of the frame member and fan shroud by the stepped concave part that is above the lower tier heat exchangers and adjacent to the upper tier heat exchanger, wherein the cooling fan is connected to the frame member.

5. The cooling system for the construction equipment of claim 2, in which the first lower tier heat exchanger is an oil cooler, wherein the upper tier heat exchanger is an intercooler.

6. The cooling system for the construction equipment of claim 2 further comprising:
   a fan shroud mounted on the frame member and surrounding the cooling fan, wherein the tank space is further defined at an upper side corner of the frame member and fan shroud by the stepped concave part that is above the lower tier heat exchangers and adjacent to the upper tier heat exchanger, wherein the cooling fan is connected to the frame member.

7. The cooling system for the construction equipment of claim 1, in which the lower tier heat exchanger is an oil cooler, the oil cooler disposed above the radiator.

8. The cooling system for the construction equipment of claim 7 further comprising:
   a fan shroud mounted on the frame member and surrounding the cooling fan, wherein the tank space is further defined at an upper side corner of the frame member and fan shroud by the stepped concave part that is above the lower tier heat exchangers and adjacent to the upper tier heat exchanger, wherein the cooling fan is connected to the frame member.

9. The cooling system for the construction equipment of claim 1, wherein the reservoir tank comprises:
   a water pouring mouth; and
   a tank cap coupled to the reservoir tank to block the water pouring mouth, wherein the tank cap is configured to release the gas phase from the reservoir tank to a drain path when pressure inside the reservoir tank exceeds a pre-set upper limit pressure.

* * * * *